United States Patent
Wyllie

(10) Patent No.: US 7,580,935 B2
(45) Date of Patent: Aug. 25, 2009

(54) SYSTEM ALLOWING PROVISION OF DIGITAL CONTENT OVER INTERNET USING A WEB BROWSER AND STORING IT ON A MEDIUM

(76) Inventor: Mark Wyllie, 27 High Street, Lindfield, West Sussex, RH16 2HJ (GB)

( * ) Notice: Subject to any disclaimer, the term of this patent is extended or adjusted under 35 U.S.C. 154(b) by 0 days.

(21) Appl. No.: 10/332,595

(22) PCT Filed: Jun. 11, 2001

(86) PCT No.: PCT/GB01/02575

§ 371 (c)(1),
(2), (4) Date: Oct. 23, 2003

(87) PCT Pub. No.: WO02/05128

PCT Pub. Date: Jan. 17, 2002

(65) Prior Publication Data

US 2004/0148269 A1 Jul. 29, 2004

(30) Foreign Application Priority Data

Jul. 11, 2000 (GB) .................................. 0017064.7
Nov. 15, 2000 (GB) .................................. 0027892.9
Jan. 15, 2001 (GB) .................................. 0101045.3

(51) Int. Cl.
*G06F 17/30* (2006.01)

(52) U.S. Cl. ........................ 707/10; 707/104.1; 725/80; 725/81; 725/82

(58) Field of Classification Search .................... 707/10, 707/104.1; 725/80–82
See application file for complete search history.

(56) References Cited

U.S. PATENT DOCUMENTS

| 5,703,951 | A | * | 12/1997 | Dolphin | ........................ 705/51 |
| 5,900,608 | A | | 5/1999 | Iida | |
| 6,021,517 | A | * | 2/2000 | Yamamoto et al. | .......... 714/763 |

(Continued)

FOREIGN PATENT DOCUMENTS

EP 1 003 115 5/2000

(Continued)

OTHER PUBLICATIONS

Jacobi, Jon L., "Read, Write CDs in a Flash", Dec. 30, 1998, PC World, 3 pages printed from http://www.webshopper.com/news/article/0,aid,9201,00.asp on Jun. 17, 2005.*

(Continued)

*Primary Examiner*—Wilson Lee
*Assistant Examiner*—Michael Le
(74) *Attorney, Agent, or Firm*—Cooper & Dunham LLP

(57) ABSTRACT

A method of providing digital content to a user, said method comprising storing a selection of content for provision on request to the user, arranging for said user to select original content from said selection, arranging for the selected original content to be written to a selected portable rewritable record carrier, subsequently storing updated context associated with said selected original content, and arranging for the updated content to be written to the selected portable rewritable record carrier such that such carrier carries both said original content and said updated content.

9 Claims, 3 Drawing Sheets

U.S. PATENT DOCUMENTS

| | | | |
|---|---|---|---|
| 6,023,713 A | 2/2000 | Grimsrud et al. | |
| 6,055,566 A | 4/2000 | Kikinis | |
| 6,201,771 B1 | 3/2001 | Otsuka et al. | |
| 6,434,535 B1* | 8/2002 | Kupka et al. | 705/24 |
| 6,535,911 B1* | 3/2003 | Miller et al. | 709/217 |
| 6,564,380 B1* | 5/2003 | Murphy | 725/86 |
| 6,618,758 B1* | 9/2003 | Ubowski | 709/232 |
| 2001/0025269 A1* | 9/2001 | Otsuka | 705/52 |
| 2002/0146122 A1* | 10/2002 | Vestergaard et al. | 380/231 |

FOREIGN PATENT DOCUMENTS

| | | | |
|---|---|---|---|
| JP | 11252486 | * | 9/1999 |
| JP | 20 0010876 | | 1/2000 |
| JP | 20 00181465 | | 6/2000 |
| WO | WO9515649 | | 6/1995 |
| WO | WO9743761 | | 11/1997 |
| WO | WO0043905 | | 7/2000 |
| WO | WO0118686 | | 3/2001 |
| WO | WO0205128 | | 1/2002 |

OTHER PUBLICATIONS http://www.wired.com/news/culture/0,1284.36915.00.html. "Stephen King, the E-Publisher", M. Rose, Nov. 6, 2000. 4 Pages.

http://pr.mp3.com/pr/58.html "MP3.com passes Milestone with 10 Million Registered Members", Feb. 24, 2000. 2 Pages.

http://www.goodnoise.com/s=700ce3aadf44226f2cd:h=4ac:/about/pr/pr10.html "Goodnoise begins selling downloadable music", Jul. 30, 1998. 2 Pages.

http://www.mp3.com/news/074.html "New Music Site Fashions Biz Model Around MP3", M. Robertson, Jul. 27, 1998. 2 Pages.

* cited by examiner

File Management Function
PRE-FORMATTED SCENARIO
Figure 4A
Figure 4B
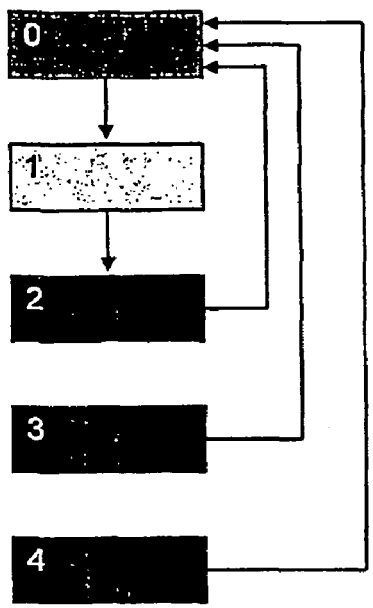
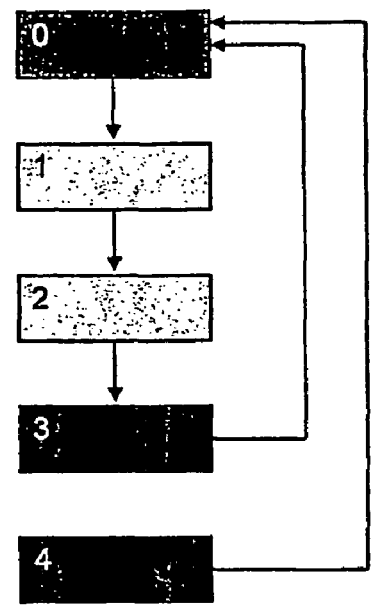
File Management Function
NON-FORMATTED SCENARIO
Figure 4C
Figure 4D
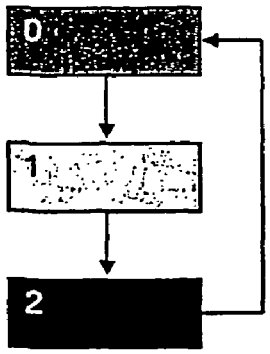
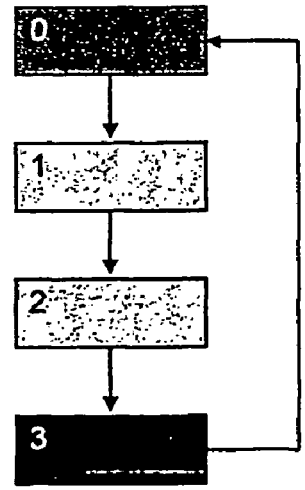

SYSTEM ALLOWING PROVISION OF DIGITAL CONTENT OVER INTERNET USING A WEB BROWSER AND STORING IT ON A MEDIUM

BACKGROUND

1. Field of Disclosure

This invention relates to a method of providing digital content to a user. Particularly, although not exclusively, the invention relates to on-line ordering of multimedia products via a public data communications network, such as the Internet.

2. Description of the Related Art

With the increase in popularity of and accessibility to the Internet together with the increase in relatively higher bandwidth data connections to client terminals, the purchase of products which can be sent to a customer via high bandwidth data connections (including wireless connections) is increasing. Multimedia products which particularly lend themselves to such a method of purchase are those associated with the entertainment industries where audio and/or visual products can readily be rendered as digital data which may be sent via data connections, such as terrestrial, cable, satellite and Internet networks.

Currently, multimedia products may also be purchased on optical discs such as Digital Versatile Discs (DVD). DVD technology has progressed with the advent of recordable and rewritable DVDs. There are a number of different types, including DVD-R which allows only a single recording to be made on each disc, and DVD-RAM, DVD-RW and DVD+RW which allow many recordings to be made on each disc.

SUMMARY

The present invention provides a method of providing digital content to a user, said method comprising storing a selection of content for provision on request to the user, arranging for said user to select original content from said selection, arranging for the selected original content to be written to a selected portable rewritable record carrier, subsequently storing updated content associated with said selected original content, and arranging for the updated content to be written to the selected portable rewritable record carrier such that such carrier carries both said original content and said updated content.

DESCRIPTION OF THE DRAWINGS

In order that the invention may be well understood, an embodiment thereof, which is given by way of example only, will now be described with reference to the accompanying drawings, in which:

FIG. 4 is a diagram illustrating the file management function.

DETAILED DESCRIPTION

Figure 1:
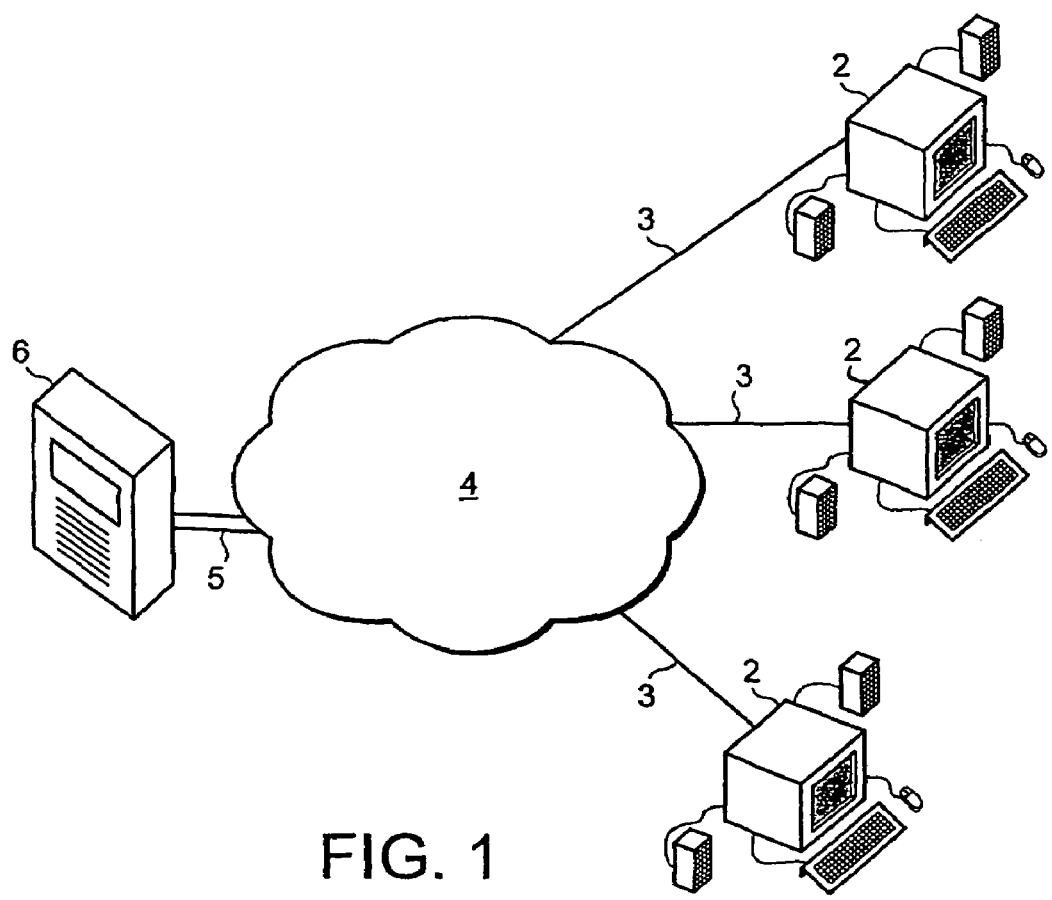
FIG. 1 is a schematic illustration of a network configuration used in an embodiment of the invention.

Referring to FIG. 1, a plurality of users at client terminals 2 request (and receive) multimedia content via datalinks 3, preferably Digital Subscriber Lines (DSL) or more preferably Asymmetric Digital Subscriber Lines (ADSL), over a public data network 4, in this embodiment the Internet, from a data processing server 6 which is connected to the Internet by means of connection 5, such as an ATM (Asynchronous Transfer Mode).

Each client terminal 2 comprises a computer workstation having a caching facility, a graphical display, data input means such as a keyboard and a pointing device, e.g. a mouse, and an audio output means such as stereo/surround loudspeakers. Each of the client terminals 2 includes a computer program in the form of an Internet browser, such as Netscape (TM) or Internet Explorer (TM), to enable the client to interact with the server. The computer workstation is also equipped with a writer for portable writable record carriers such as a writer for a rewritable DVD or more specifically a DVD-RAM (Random Access Memory) or DVD-RW/DVD+RW (rewritable) discs.

Figure 2:
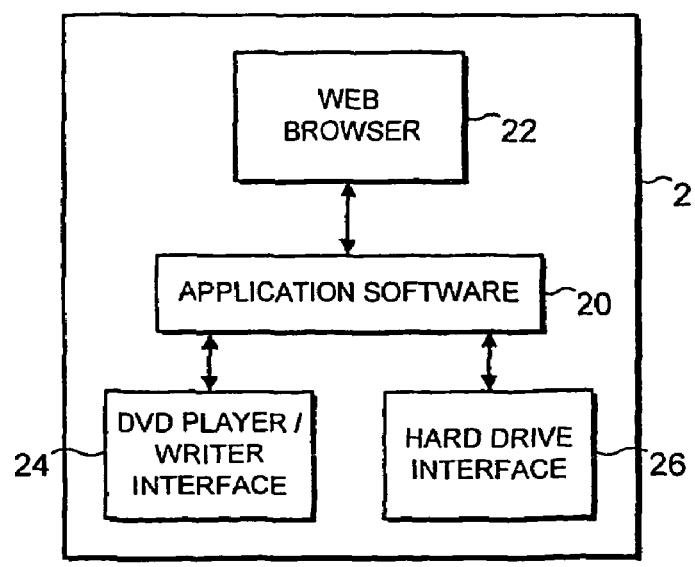
FIG. 2 is a schematic illustration of software when resident on a client terminal as opposed to resident on the data processing server 6 (FIG. 1)

FIG. 2 is an example of a client terminal 2 according to embodiments of the present disclosure. Terminal 2 includes a web browser 22, application software 20, DVD player/writer interface 24 and hard drive interface 26.

The data processing server 6 includes various interworking computer programs, including a database program, such as an Oracle database, a web server program for storing and enabling clients to retrieve multimedia resources, such as HTML pages, and image and sound files.

According to this embodiment, a user is able to issue a request for data at a client terminal 2 using a browser which sends the request to the data processing server 6 via the Internet. The data processing server 6 processes the request and subject to authorisation sends encrypted data to the client terminal where it is decrypted and written to a DVD installed in the DVD reader/writer.

Figure 3:
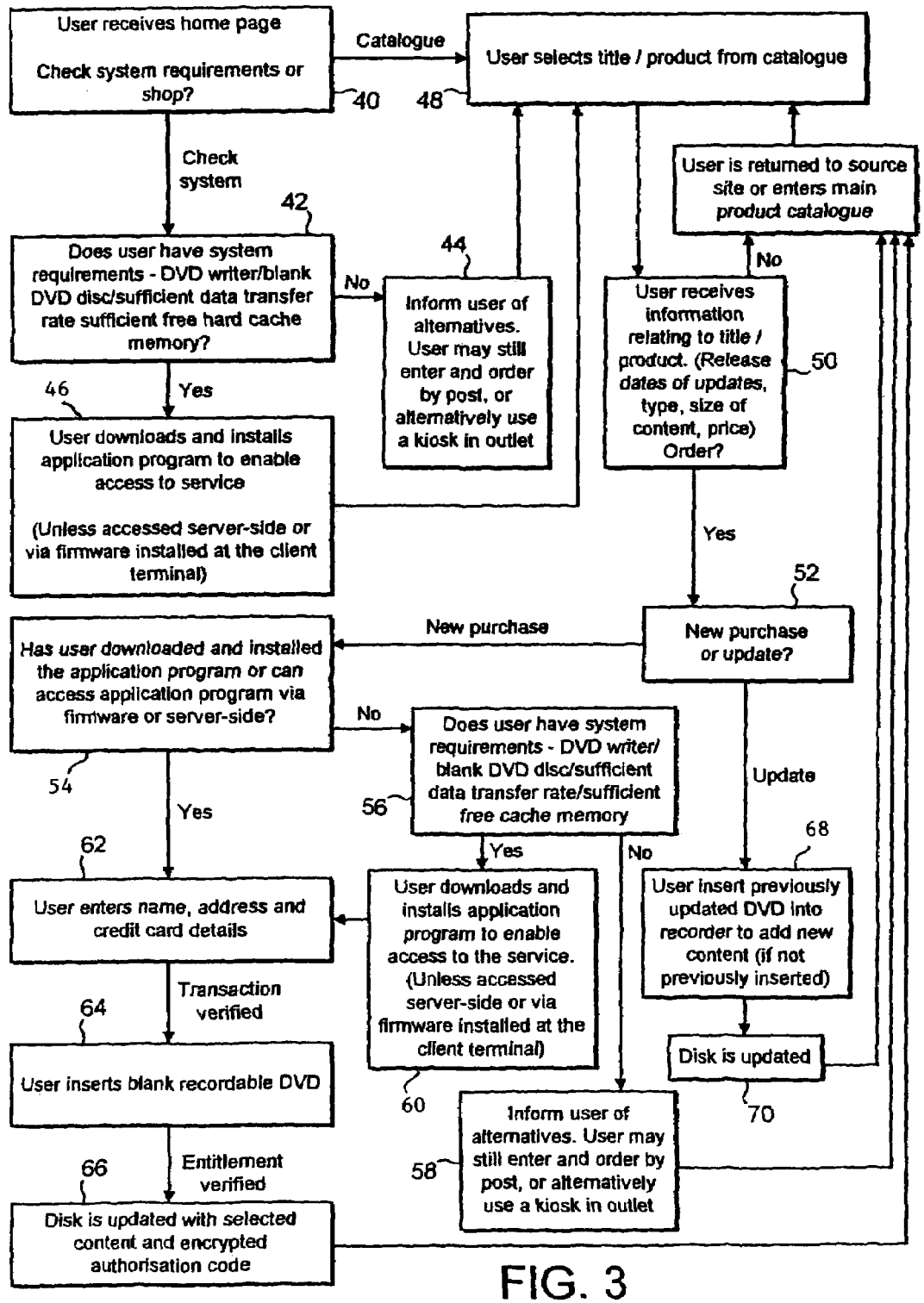
FIG. 3 is a client-side system flow chart.

Referring to FIG. 3, web pages on the data processing server 6 are accessed by way of a graphical based interface known in the art as a browser at the client terminal. The interaction of a browser and server is well known in the art and for the purposes of the embodiment will be described only briefly. Users navigate their way through pages primarily by selecting graphically presented hyperlinks. Selecting a hyperlink links the user to other pages stored on the server and to downloadable files.

When the user visits the home page, he is presented as shown at box 40 with a summary of the system described above. If the user has not accessed the system previously, he is prompted to check that his client terminal 2 meets the minimum requirements for using the system. He may alternatively decide to progress through the system and check minimum requirements later in the process. As shown at box 42, the basic minimum requirements are that the client terminal is equipped with a DVD writer with reading and writing functions, a rewritable DVD, sufficient cache memory and has network access via a relatively high band-width data connection, such as an Asymmetric Digital subscriber Line (ADSL) connection.

If the client terminal does not possess the minimum requirements, the user is prompted to select 'NO' whereupon he is informed as shown in box 44 that he will not be able to acquire content via the data network although he will be able to order using the system and acquire content by post or by visiting an outlet equipped with a client terminal (kiosk) possessing the minimum requirements.

These two options will be described in further detail hereinafter.

If the client terminal possesses the minimum requirements, the user may either select "YES" whereupon as shown at box 46 the server requests the user to initiate downloading of the required application software to enable access to the use of the service, or the user may opt to gain access to the use of the service by using application software resident on the data processing server (6). The application software comprises encryption and authorization functions, interrupted download and corrupted data compensation functions, a caching function, a jump function and a file management function which operates in conjunction with the reader/writer functions of the DVD writer.

Once the application software has either been sent to the client terminal, downloaded and installed at the client terminal, or is accessed directly from the data processing server (6), the user is then prompted to go to the on-line catalogue as shown at box 48 or alternatively may request to go directly to the on-line product catalogue instead of following the above procedure shown in boxes 42 to 46.

The on-line product catalogue comprises linked pages which together list a plurality of hyperlinks to files/programs stored on the server that can be selected by the user, downloaded and written to a disc at the client terminal. For the purposes of the embodiment, the system will be described with reference to files containing multimedia products. These products may relate to, for example, any of the music industry, the film industry, sports, or a combination thereof.

The products are categorised, on a subscription basis, into sub-sets of the total content on offer. In the case of a music product offering, for example, the products may be sorted by musical artists, such as contemporary musicians or groups, classical musicians, composers etc. The product files contain for instance audio tracks and albums, music videos and concerts, and interviews.

The user is either prompted to select a title from the displayed catalogue (box 48) or alternatively, is linked from an independent website directly to a specific title whereupon products relating to that title are listed together with release dates, type and size, price information (box 50). The user is prompted to make an order for the particular title or return to either the main catalogue or the location from which they were delivered. If the user selects to order, as shown at box 52 he is asked if it is a new purchase or an update to a previous purchase. The procedure for an update will be described later.

The products on offer comprise entitlements to access multimedia content for a particular title, over a predetermined subscription period, for example one year. The content available for each title is periodically updated, for example on a monthly or weekly basis with new content to be downloaded by a subscribing user.

Before making a new purchase, as shown at box 54 the user is prompted to check that his terminal connection meets minimum requirements and to select 'YES' if this has already been established and the application software downloaded and installed or access to the use of the application software via the data processing server (6) has been established.

If the user has not checked minimum requirements, he is prompted to select 'NO' whereupon as shown in boxes 56 to 60 he is guided through the same procedure as described with reference to boxes 42 to 46 above. In either event, once the application software is accessed, the user is prompted to submit his personal information (name, postal address, electronic address etc.) and payment information (credit/debit card details) as shown in box 62. The information may be SSL (Secure Socket Layer) encrypted for protection of the transaction. An SSL encryption program currently comes as standard in most browsers.

Once the payment information has been validated, as shown at box 64 the user is prompted to insert a rewritable DVD into the DVD writer. Based on the purchase selection made by the user the server generates an authorisation code which is sent to the client terminal, processed by the application software and written in encrypted form to the DVD. The authorisation code may be encrypted by the server, and saved in that form on the disc. The code may also include a digital signature characteristic of the server, allowing the server later to validate the code. This authorisation code is the means by which the server recognises that payment for a particular product has been made.

Once the authorisation code has been saved to the DVD, as shown at box 66, the server transfers the selected files to the client terminal. The data sent to the client terminal is temporarily stored and organised in the cache, which together with a new menu file is written to the disc. Once written to the disc, the files in the cache are deleted to reduce any possibility of the user writing the files to more than one DVD without permission. This operation is handled by the application software in combination with the standard software contained within the client terminal.

In order to prevent the user from copying the content of the DVD to another record carrier, the DVD may be copy prohibit protected.

Once the data files and new menu file have been written to the DVD, the files can be accessed either at the client terminal or by playing the DVD on a DVD compliant player/writer, such as a portable player or an integer of a home hi-fi system. However, it is still possible to update the disc without in effect over writing previously stored files. Therefore, staggered recording can be achieved.

If the user wishes to update a DVD, the user either visits the on-line shopping web page and selects a subscription/title for which he has validly subscribed as shown at box 48, or is linked from an independent website directly to a specific title, or may automatically be linked via a routine programmed on the DVD.

The user is then presented with associated files for the selected 5 subscription/title including those which have been released subsequent to his previous download. After selecting that an order/update is to be made as shown in box 50, the user selects that he wishes to update a DVD, see box 52. As shown at box 68, the user is prompted to insert (if not previously inserted) the DVD that he wishes to update. The server then instructs the application software to provide the authorisation code previously written to the DVD. The application software retrieves the code, and provides it to the server. Once the code has been verified as indicating a current and appropriate subscription, the user is presented with the files released subsequent to his previous download and prompted to confirm he wishes the DVD to be updated, the process of which is described hereinafter.

To start updating the DVD from the point at which writing previously stopped, the updated files are sent by the server to the client terminal and written to the cache at the client terminal. The application software is arranged to encrypt the content during caching, so that the files cannot be accessed on the client terminal cache, only from the DVD directly after it is written. The updated content or data "package" is subsequently written to the DVD containing the existing files as described below. The cached files in the cache are then disabled or deleted to prevent the user writing them to more than one DVD without permission.

The data "package" consists of one or more new/revised menu files and one or more new data files. Each data file contains commands which navigate to the VMGM (Video Manager Menu) domain or first play domain.

When a rewritable DVD is pre-formatted to contain a template consisting of multiple files routed to a menu file, an update is accomplished by a new data file (2, FIG. 4B) replacing an existing file (2, FIG. 4A). The new data file (2, FIG. 4B) is momentarily routed via the VMGM (Video Manager Menu) domain (containing one or more menu files) or the first play domain to an existing file (3, FIG. 4B) which in turn is routed to the revised menu file (0, FIG. 4B) preserving the flow necessary to enable playback in DVD compliant player/writers.

When a rewritable DVD is not pre formatted as described above, it is necessary to initially write a new menu file (0), a new data file (1) which is momentarily routed via the VMGM or first play domain to an additional data file (2) which is routed to the menu file to form the flow as shown in FIG. 4C. In order to perform an update, FIG. 4D shows that because the new data file (2, FIG. 4D) which is momentarily routed via the VMGM or first play domain to the following file, has replaced the existing file (2, FIG. 4C), an additional file (3, FIG. 4D) must be added and routed to the revised menu file (0, FIG. 4D) to preserve the flow necessary to enable playback in DVD compliant player/writers.

The File Management Function in both formatted and non formatted scenarios share commonality in that both methods require writing a "package" S of data consisting of a new or revised menu file and one or more data files containing navigational commands which preserve the flow necessary to enable playback in DVD compliant players.

The process by which the routing is achieved is by utilising the Jump Function which momentarily directs the last played data file, via the VMGM domain containing one or more menu files (and/or the first play domain) to the following data file, therefore, in effect, the flow from file to file is preserved as illustrated in FIG. 4.

The last data file at the end of the chain jumps to the VMGM domain containing one or more menu files (and/or the first play domain). In this instance, any jump command set by the Jump Function is overridden and ignored as a result of a pre-programmed command contained within the last data file. The Jump Function operates in conjunction with the System Parameters (SPRMS) and/or the General Parameters (GPRMS) as follows:

Using the System Parameters (SPRMS), the destination of the jump command set in the VMGM domain containing one or more menu files (and/or the first play domain) is determined by executing a routine in which a current System Parameter value (relating to the last played data file value) is acquired and subsequently modified in order to direct a jump to the following data file.

Using the General Parameters (GPRMS), the destination of the jump command set in the VMGM domain containing one or more menu files (and/or the first play domain) is determined by the last played data file which sets a General Parameter value relating to the following data file in order to direct a jump to that data file.

FURTHER EMBODIMENTS

An alternative method for a user to initiate an update to a DVD for which he has a valid subscription and a client terminal meeting the minimum requirements, would be to run a routine programmed on the DVD which automatically launches the application software and browser. The browser establishes communication with the server which instructs the application software to provide the authorisation code previously written to the DVD. The application software retrieves the code, and provides it to the server. Once the code has been verified as indicating a current and appropriate subscription, the user is presented with the files released subsequent to his previous download and prompted to confirm he wishes the DVD to be updated, the alternative processes of which are described below.

An alternative method for updating the DVD from the point at which writing previously stopped, the content of the DVD is written to the cache at the client terminal. The updated files are sent by the server to the client terminal where they are processed, and collated with the existing files. The application software is arranged to encrypt the content during caching, so that the files cannot be accessed on the client terminal cache, only from the DVD directly after it is written. In addition to the existing and updated files being written to the DVD, the menu file is rewritten to reflect the updated content of the DVD. The cached files in the cache are then disabled or deleted to prevent the user writing them to more than one DVD without permission.

A further alternative method for updating the DVD is described as follows. Instead of the previous content of the DVD first being written to the cache, the server may transfer the previous content of the DVD together with the update. It will be appreciated that this alternative process would take longer for the download.

Should the user's client terminal not meet minimum requirements, the user can access the system either by post or in a retail outlet.

The postal process requires the user to either visit the on-line home page and to select a title or product, or he is linked from an independent website and directed to a particular title or product. The selection can be sent to the server via the Internet together with the user's personal and payment information. The files selected can then be written to DVD at the host end and forwarded to the user at his postal address. The same process would be required for updates although in this case the DVD previously written to, in which case the DVD may be returned to the host by post for updating.

Alternatively, a new or replicated DVD containing original and updated content could be forwarded to the user at his postal address. The previous outdated DVD could be returned to the host.

As an alternative to the postal process, the user can visit a retail outlet, such as a so-called music shop or video store, which is equipped with a "kiosk" or client terminal meeting the minimum requirements.

The user would carry out the usual process as described with reference to FIG. 3 although as an alternative to sending payment information to the server, the retail outlet could collect payment from the user on behalf of the host. Furthermore, the DVD could be purchased containing original content and subsequently updated using the methods described above.

One advantage of accessing a client terminal in a retail outlet is that once a file has been sent to the client terminal by the server it can be stored and retained, at least during a period of high demand so that subsequent requests for the same file may be serviced directly from the terminal rather than via a data connection.

It will further be apparent to the skilled man that when the client terminal cache retains all content relating to a particular subscription, for example a kiosk's cache, the entire disk may rewritten with all current content relating to that subscription.

It will also be apparent to the skilled man that the client terminal may consist of an entertainment system comprising of a compliant enhanced television/receiver with compliant return path, a hardware and software implementation enabling browser navigation and data input, sufficient processing capability for the application program as described previously, sufficient caching facility and a compliant DVD reader/writer. The client terminal may also consist of a combination of the entertainment system above and the PC based system described previously.

It will also be apparent to the skilled man that the application program used in any of the methods described herein may be provided within the firmware of the client terminal as opposed to being accessed via download methods, or accessed via the server side.

It will also be apparent to the skilled man that alternative forms of data transport may be used to implement any method described herein, such as, for example only, terrestrial, cable and satellite networks in combination with a compliant return path.

It will be appreciated that any of the methods for initiating an update as described above may be combined with any of the described methods for updating.

It is to be appreciated that various modifications and alternatives may be made in relation to the above described embodiments without departing from the scope of the invention, which is defined in the appended claims.

The invention claimed is:

1. A method of providing digital content to a user, said method comprising:
    storing at a server side system a selection of content for provision to the user at a user side system upon user request;
    arranging for said user to select original content from said selection, the original content comprising an original package including at least one data file and one original menu;
    arranging for the selected original content to be downloaded from the server side system upon user request and written to a selected portable record carrier associated with the user side system;
    subsequently storing at the server side system updated content associated with said selected original content, the updated content comprising an updated package including at least one new or updated data file and one new or updated menu; and
    arranging for the updated package to be downloaded from the server side system upon user request and written to a cache associated with the user side system, wherein the original content is written from the selected portable record carrier to the cache associated with the user side system along with the updated content and wherein the original content and the updated content are processed and collated and then written to the selected portable record carrier, such that said portable record carrier carries both said at least one original data file and said at least one new or updated data file and said one new or updated menu, wherein said new or updated menu is generated at the server side system without first receiving the original menu from the user side system.

2. A method according to claim 1, wherein said content is transmitted to the user at a client terminal over a public data network and written to the portable record carrier at the client terminal.

3. A method according to claim 1, wherein an authorization code is written to the portable record carrier based on an order made by the user so that said order can be validated when the user makes a subsequent access attempt.

4. A method as claimed in claim 1, wherein when the user selects the original content, the user takes a subscription valid for a subscription period for a particular category of contents so that when the user makes a subsequent request for one or more items of content in said category during the subscription period, the user has entitlement thereto as part of said subscription.

5. A method as claimed in 1, wherein said portable record carrier comprises a portable rewritable record carrier.

6. A method as claimed in claim 1, wherein the updated content is written to a cache memory at the client terminal and is subsequently written to the selected portable record carrier carrying said original content so that said portable record carrier carries both said original content and said updated content.

7. A method as claimed in claim 1, wherein when writing to the selected portable record carrier is completed, at least one of a compliant player and writer can read the carrier.

8. An apparatus for providing digital content to a user, said apparatus comprising:
    means for storing a selection of content for provision to the user at a user side system upon user request;
    means for arranging for said user to select original content from said selection, the original content comprising an original package including at least one data file and one original menu;
    means for arranging for the selected original content to be downloaded from the server side system upon user request and written to a selected portable record carrier associated with the user side system;
    means for subsequently storing at the server side system updated content associated with said selected original content, the updated content comprising an updated package including at least one new or updated data file and one new or updated menu; and
    means for arranging for the updated package to be downloaded from the server side system upon user request and written to a cache associated with the user side system, wherein the original content is written from the selected portable record carrier to the cache associated with the user side system along with the updated content and wherein the original content and the updated content are processed and collated and then written to the selected portable record carrier, such that said portable record carrier carries both said at least one original data file and said at least one new or updated data file and said one new or updated menu, wherein said new or updated menu is generated at the server side system without first receiving the original menu from the user side system.

9. A system for providing digital content to a user, said system comprising:
    a server side system for,
        storing a selection of content for provision to the user at a user side system upon user request, and
        for subsequently storing updated content associated with said selected original content, the updated content comprising an updated package including at least one new or updated data file and one new or updated menu;
    a user side system for,
        allowing said user to select original content from said selection, the original content comprising an original package including at least one data file and one original menu,
        downloading and writing the selected original content from the server side system upon user request to a selected portable record carrier associated with the user side system, and
        subsequently downloading and writing the updated package from the server side system upon user request to a cache associated with the user side system, wherein the original content is written from the selected portable record carrier to the cache associated with the user side system along with the updated content and wherein the original content and the updated content are processed and collated and then written to the selected portable record carrier, such that said portable record carrier carries both said at least one original data file and said at least one new or updated data file and said one new or updated menu, wherein said new or updated menu is generated at the server side system without first receiving the original menu from the user side system.

* * * * *